United States Patent [19]

Brouwer et al.

[11] Patent Number: 4,832,130
[45] Date of Patent: May 23, 1989

[54] SOD HARVESTER WITH CONVEYOR STRUCTURE

[75] Inventors: Gerardus J. Brouwer, Keswick; Henry Zwambag, Sutton, both of Canada

[73] Assignee: Brouwer Turf Equipment Limited, Keswick, Canada

[21] Appl. No.: 923,558

[22] Filed: Oct. 27, 1986

[30] Foreign Application Priority Data

Oct. 28, 1985 [CA] Canada .................................. 494053

[51] Int. Cl.$^4$ ............................................. A01B 45/02
[52] U.S. Cl. ........................................ 172/19; 172/33; 198/301; 198/308.1; 198/310
[58] Field of Search ...................... 172/2, 3, 19, 20, 33, 172/69, 521; 198/301, 308.1, 310, 313, 314, 317, 318; 414/488, 489, 502, 503, 548, 551

[56] References Cited

U.S. PATENT DOCUMENTS

| | | | |
|---|---|---|---|
| 2,387,977 | 10/1945 | Blackie | 198/308.1 |
| 2,617,347 | 11/1952 | Provost | 172/20 |
| 2,646,162 | 7/1953 | Brunsvold | 198/310 |
| 3,519,082 | 7/1970 | Miner | 172/20 X |
| 3,650,330 | 3/1972 | Gieringer et al. | 172/19 |
| 3,664,432 | 5/1972 | Nunes, Jr. | 172/19 |
| 3,887,013 | 6/1975 | Helberg | 172/20 |
| 3,987,890 | 10/1976 | Merritt | 198/317 X |
| 4,160,501 | 7/1979 | Johannsen | 198/313 X |

Primary Examiner—Richard T. Stouffer
Attorney, Agent, or Firm—Rogers, Bereskin & Parr

[57] ABSTRACT

A sod harvester in which sod is cut, conveyed upwardly, and then travels downwardly over a floppy conveyor and falls into a roll forming enclosure formed by a bottom conveyor and a vertical conveyor. The floppy conveyor swings downwardly at the start of roll forming, to reduce the free fall of the sod, and swings upwardly as the roll grows. When the roll is formed, the bottom conveyor is unlatched and tilts downwardly to discharge the roll, at the same time pulling into cocked position a core tube injector arm. When the roll discharges, the bottom conveyor snaps upwardly, releasing the core tube injector arm which injects a fresh core tube into the roll forming enclosure. The sod is rolled with its grass side outwardly to facilitate laying and to protect the grass roots. A tray on a cart at the end of the harvester receives the discharged roll and can convey it to either side of the cart. When the tray reaches either side of the cart, a cam tilts the tray to discharge the roll onto the ground clear of the next pass of the harvester.

30 Claims, 14 Drawing Sheets

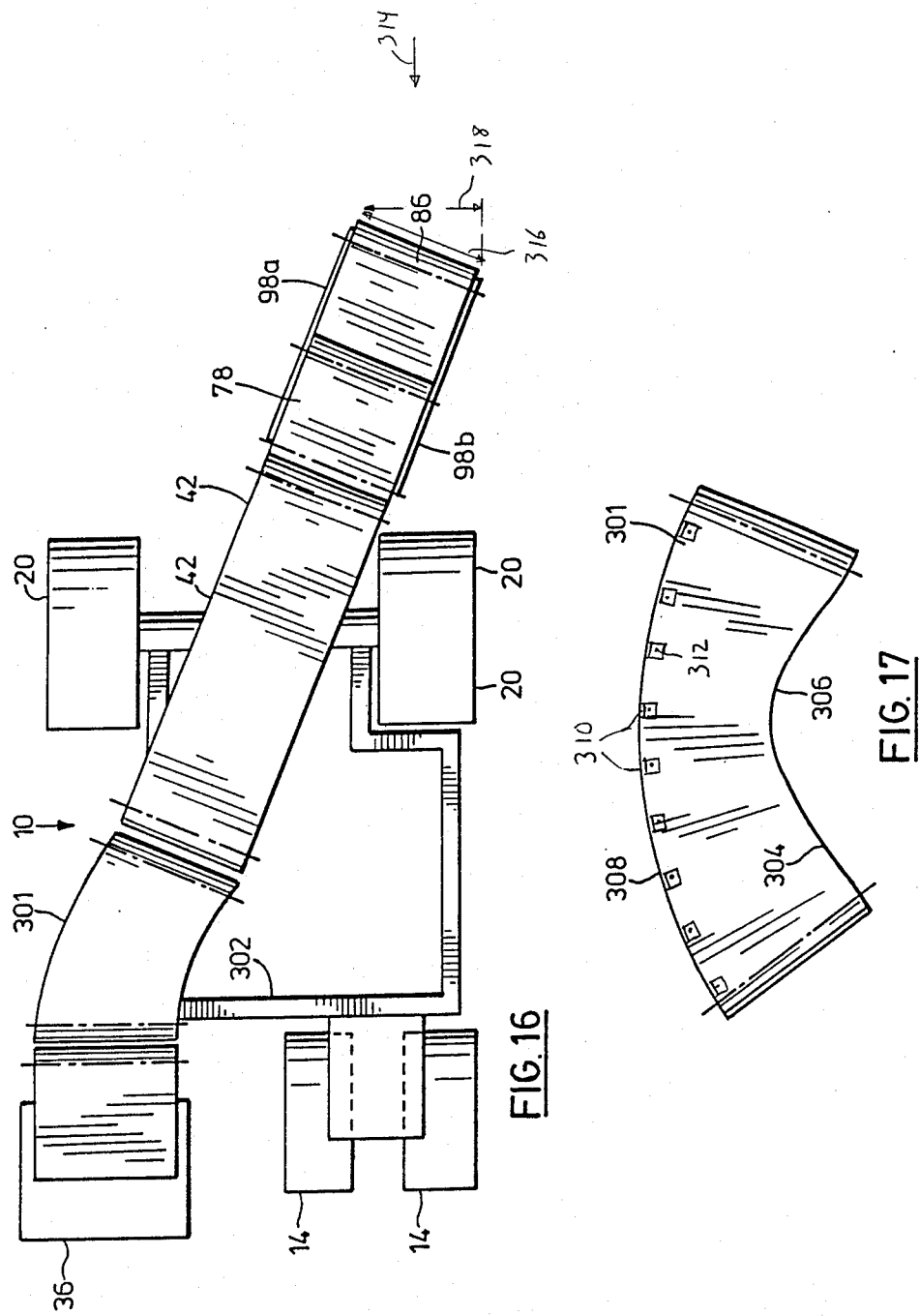

SOD HARVESTER WITH CONVEYOR STRUCTURE

BACKGROUND OF THE INVENTION

This invention relates to a sod harvester. More particularly it relates to improvements in apparatus for forming rolls from the newly harvested sod.

For many years sod harvesters have been available in which strips of sod are cut from the ground and automatically formed into rolls. However such harvesters have had at least two major disadvantages. Firstly, it has been necessary to remove the rolls by hand from the harvester once they have been formed, at least if they are to be clear of the next pass of the harvester. No automatic method has been available for discharging the rolls to a position clear of the harvester. The manual discharge has required additional costly labour. Secondly, partly because the rolls must be manually handled, their size has been severely limited. The relatively small rolls which can be handled manually are not suitable for automatic laying of the sod, creating increased laying costs. Even if larger rolls could be handled manually, the equipment used to form sod rolls in the past has not generally been suitable for forming large rolls of sod and discharging such rolls to a position where they would not interfere with the next pass of the harvester. In addition the prior art harvesters have not, so far as the applicant is aware, been capable of forming large rolls with the grass side of the sod facing outwardly, a technique which it has been found greatly facilitates laying of the sod.

BRIEF SUMMARY OF THE INVENTION

Accordingly, it is an object of the present invention in one of its aspects to provide a sod harvester with improved means for forming sod rolls. In this aspect the invention provides a sod harvester comprising:

(a) means for undercutting sod, (b) first conveyor means for conveying cut sod to a raised position and discharging said sod from said raised position, (c) a sod roll forming enclosure below said raised position, (d) second conveyor means located in said sod roll forming enclosure for forming a roll of sod, (e) at least one of said first and second conveyor means being movable toward and away from the other, (f) and means for automatically adjusting the relative distance between said first and second conveyor means to reduce the distance through which sod must drop unsupported from said first conveyor means to said second conveyor means, whereby to minimize breakage of said sod as it is formed into a roll.

BRIEF DESCRIPTION OF THE DRAWINGS

Further objects and advantages of the invention will appear from the following description, taken together with the accompanying drawings in which:

FIG 1A shows detail of rear wheel mounting arms of FIG. 1;

FIG. 2A is a perspective view showing details of a tube injector mechanism of FIG. 2;

FIG. 16 is a diagrammatic top view of another embodiment of a harvester according to the invention; and FIG. 17 is a diagrammatic perspective view of a conveyor for the FIG. 16 harvester.

DETAILED DESCRIPTION OF PREFERRED EMBODIMENTS

Figure 1:
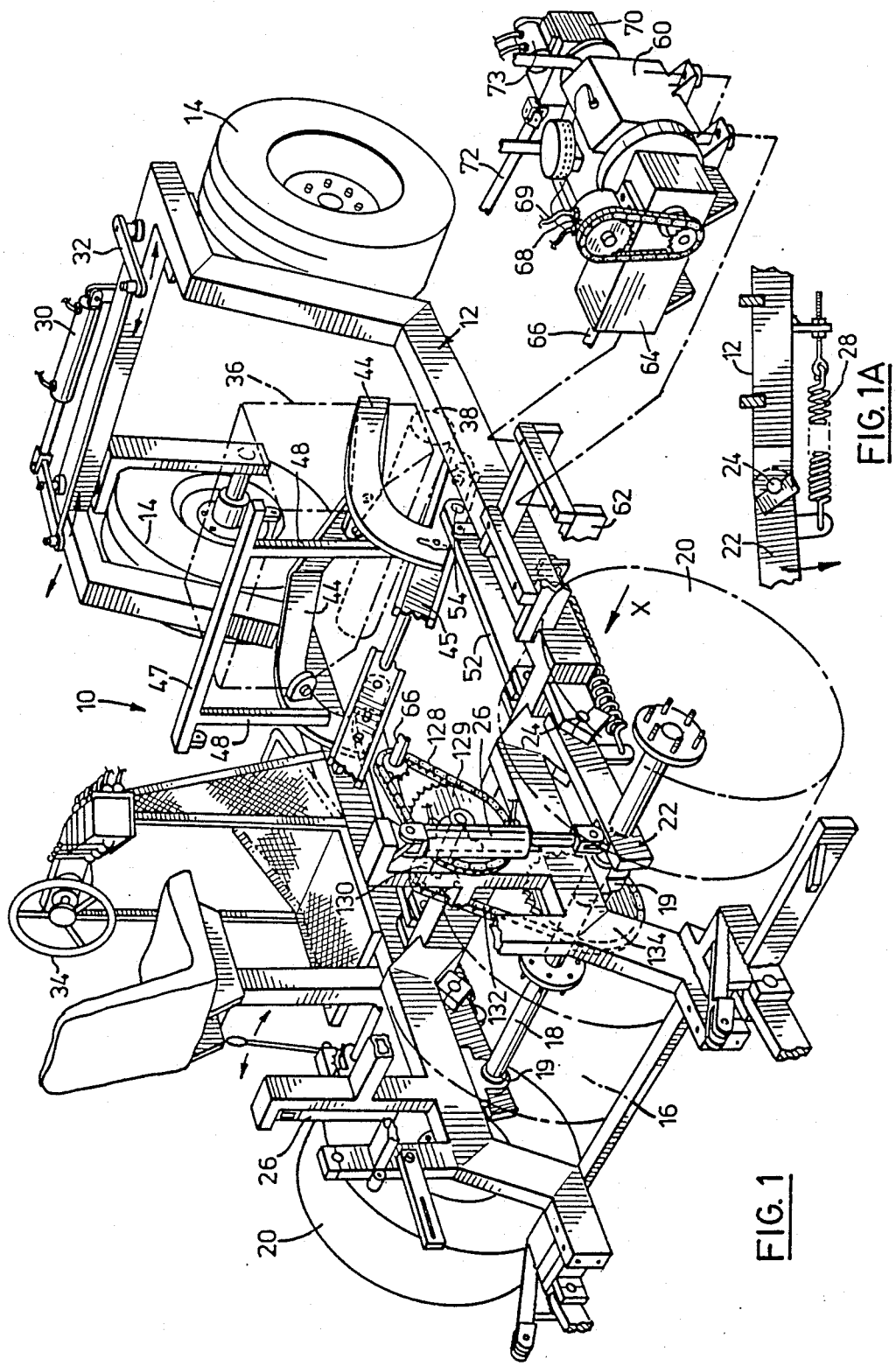
FIG. 1 is a perspective view of a sod harvester according to the invention, with certain details removed for clarity.

Reference is first made to FIG. 1, which shows a sod harvester generally indicated at 10. The harvester 10 includes a frame 12 on which are supported front wheels 14 and a central rear drive wheel 16 (see also FIG. 6). Rear wheel 16 is mounted on an axle 18 rotatably mounted in bearings 19 on frame 12. In addition the frame 12 carries two outer rear wheels 20 each freely rotatably mounted on a swing arm 22 pivoted at 24 to frame 12 and which can be raised and lowered by outrigger cylinders 26. The rear wheels 20 are normally biased downwardly by springs 28 for a purpose to be described.

The harvester is steered by a steering cylinder 30 connected by a linkage 32 to the front wheels 14 and controlled by a steering wheel 34.

The frame 12 carries a standard sod cutting mechanism 36 of the kind shown in U.S. Pat. No. 3,509,944 issued on May 5, 1970 to Brouwer Turf Equipment Limited. The sod cutting mechanism 36 includes a roller 38, an undercutting blade 40 (shown in FIGS. 3 and 6), and a main conveyor 42 to convey the cut sod upwardly and rearwardly from the undercutting blade. The sod cutting mechanism 36 will not be described since it is conventional, does not form part of the present invention, and is described in said U.S. patent.

Figure 2:
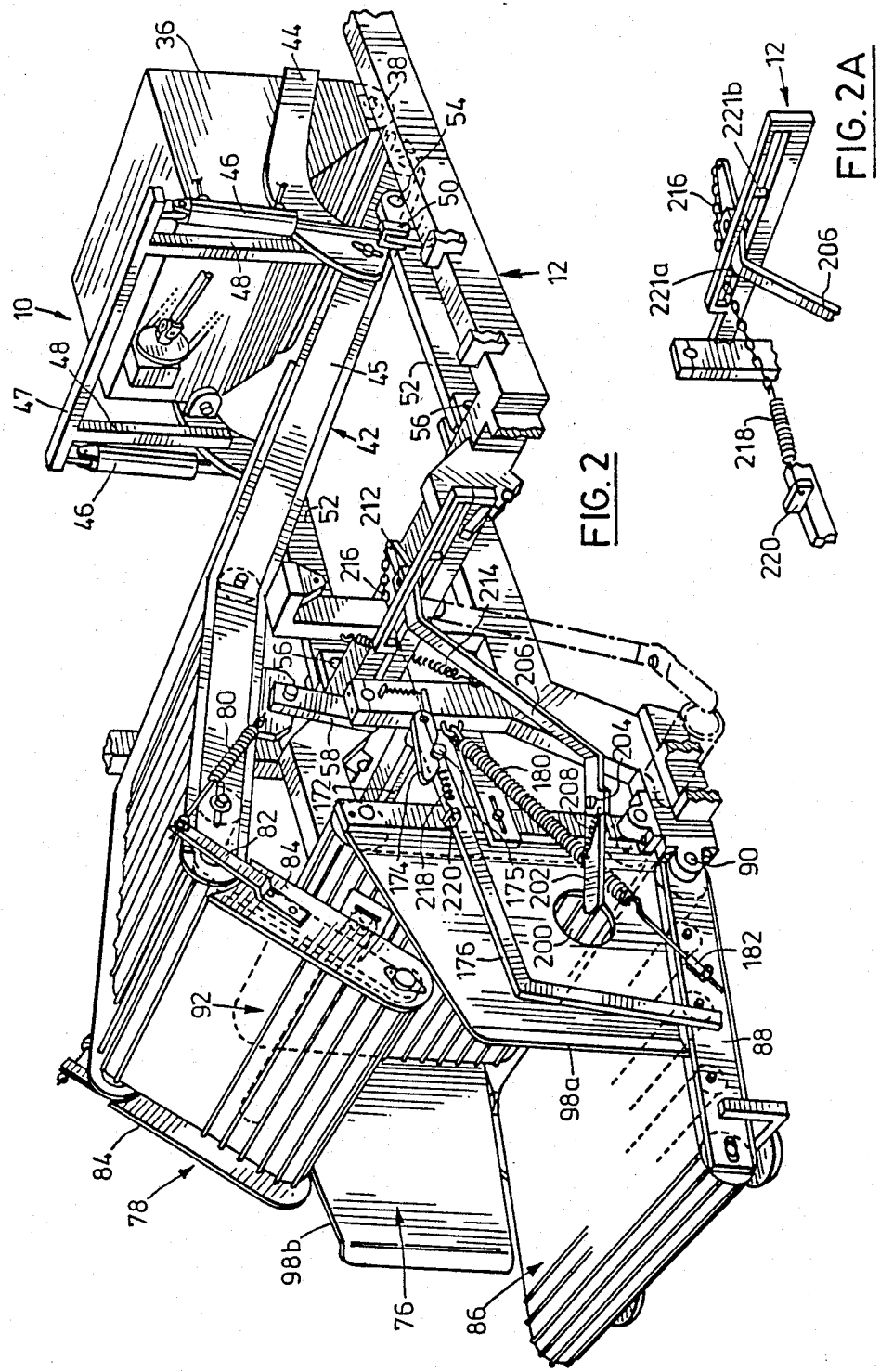
FIG. 2 shows a portion of the frame of the harvester of FIG. 1 with details thereon not shown in FIG. 1.

The sod cutting mechanism 36 is carried by a mounting yoke 44 secured to the frame of conveyor 42. As shown in FIG. 2, the yoke 44 is supported by two generally vertically extending lift cylinders 46 pivotally connected to a cross bar 47 having two downwardly extending struts 48 welded to the yoke 44. The rods of cylinders 46 are pivotally connected at 50 to the frame 12. The cylinders 46 lift the front of the conveyor 42 and the cutting mechanism 36 so that the harvester can travel with the cutting mechanism clear of the ground. The front of the conveyor is additionally guided and retained by swing links 52 pivotally connected at 54 to the conveyor frame 45 and at 56 to the frame 12. The conveyor frame 45 is also pivotally mounted, adjacent its rear, to a pair of swing links 58 (FIG. 2) which in turn are pivotally mounted to the main frame 12. The raised position of the sod cutting mechanism 36 and the conveyor 42 is shown in chain dotted lines in FIG. 3.

An engine 60 (FIG. 1) is provided, mounted on an engine cradle 62. The engine drives a gearbox 64 having an output shaft 66 which drives the central rear drive wheel 16 as will be explained. The shaft 66 also drives a sprocket which drives the conveyor 42, as will be explained. The conveyor 42 is thus driven in synchronism with ground speed (i.e. with the speed of rear drive wheel 16). The gearbox 64 further drives, in synchronism with ground speed, a hydraulic pump 68 having output hoses 69 which drive the sod roll-up conveyors as will be explained.

The engine 60 further drives a front gearbox 70 having an output shaft 72 which drives the sod cutting mechanism 36 at a constant speed. In addition the gearbox 70 drives a front hydraulic pump 73 which operates the steering cylinder 30 and the other cylinders and hydraulic equipment on the harvester (except for the rear drive wheel and the conveyers, as indicated).

Figure 3:
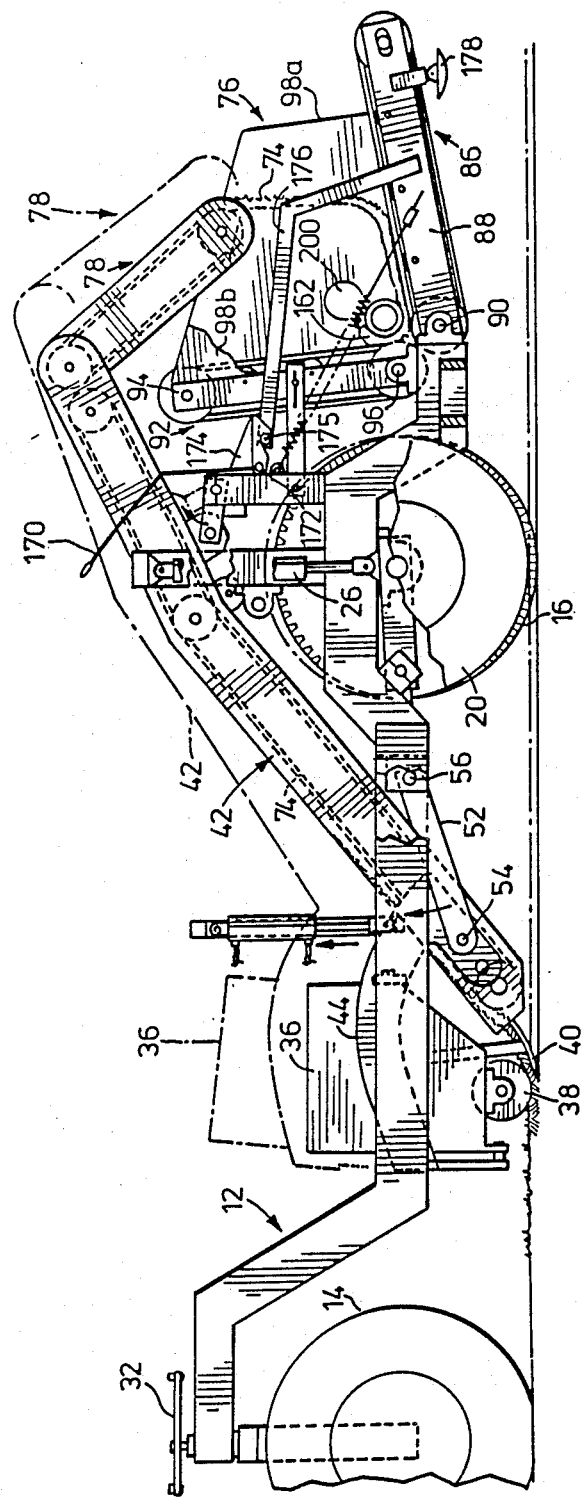
FIG. 3 is a side view of a portion of the harvester of FIG. 1, shown as it begins to form a roll of sod.

Reference is next made to FIGS. 2 and 3, which show in more detail the roll-up conveyor system. As shown, the main conveyor 42 conveys cut sod 74 from the undercutting blade 40 upwardly and rearwardly to a position over a roll forming box 76. The rear of the conveyor 42 pivotally supports a second or floppy conveyor 78 which extends rearwardly and downwardly to discharge the sod 74 into the box 76. The conveyor 78 is biased by springs 80 so that it normally hangs in a position slightly raised from that shown in FIG. 2. Each spring 80 is connected between an arm 82 bolted to the frame 84 of the second conveyor 78 and the frame 45 of the main conveyor 42.

The sod roll forming box 76 includes a bottom conveyor 86 which slopes rearwardly and upwardly from the frame 10. The frame 88 of the bottom conveyor 86 is pivotally mounted at shaft 90 to the rear of the main frame 12. The sod roll forming box 76 further includes a front conveyor 92 which slopes upwardly and forwardly from the end of the main frame 12, closely adjacent the bottom conveyor 86. The frame 94 of the front conveyor 92 is fixed at 96 to the end of the main frame 12 and is adjustable in inclination (by bolts not shown) but does not pivot during its operation. Finally, the roll forming box 76 includes a pair of side plates 98a, 98b each fixed to the frame 94 of the front conveyor 92.

Figure 7:
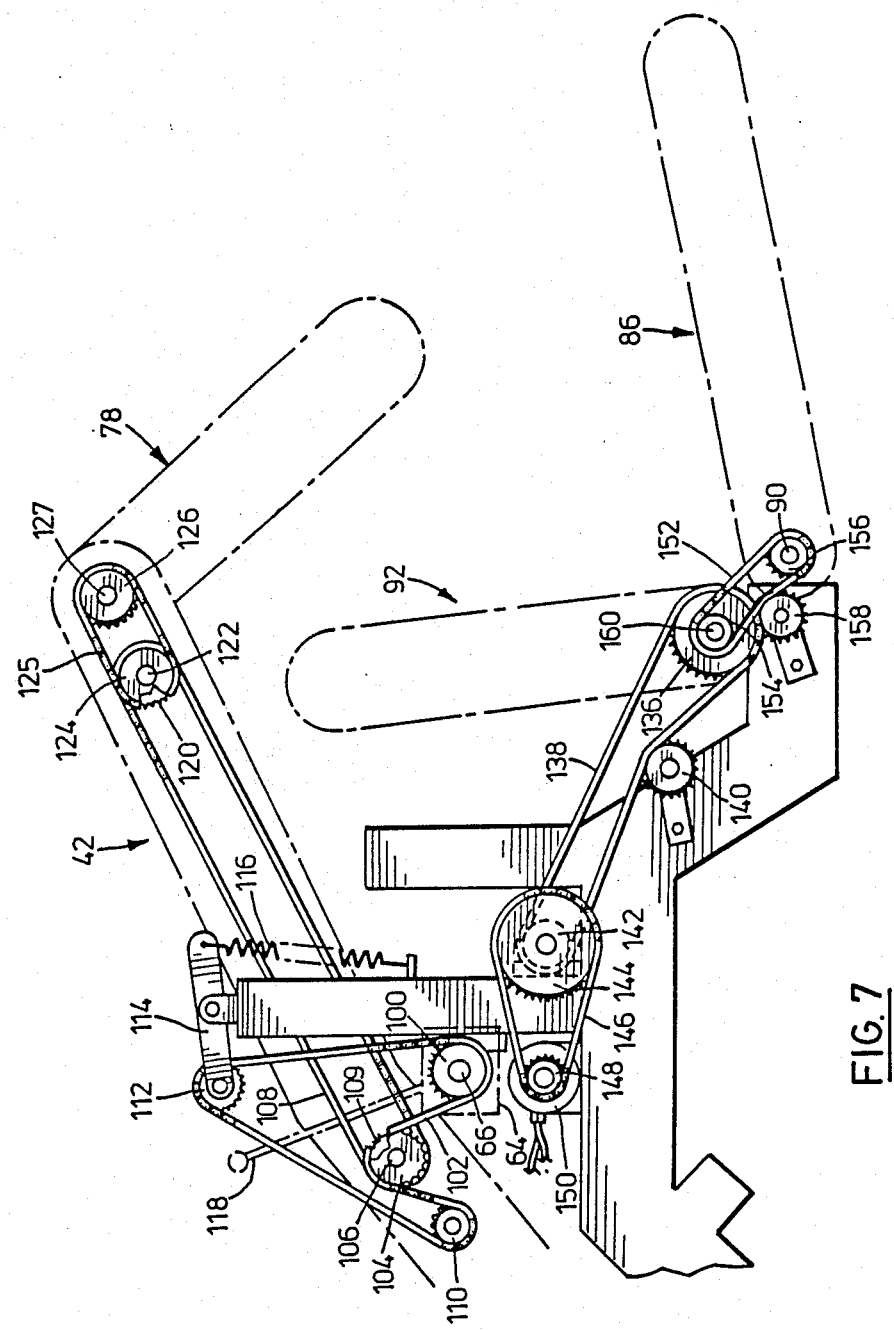
FIG. 7 is a side view showing various conveyors and sprockets of the harvester of FIG. 1.

The drive train for the various conveyors described is shown in FIG. 7. As shown, the output shaft 66 (also shown in FIG. 1) carries a sprocket 100 which drives a chain 102. The chain 102 drives a sprocket 104 on the main conveyor 42. Sprocket 104 is fixed on a shaft 106 carrying another sprocket 107 which drives chain 108 to operate the main conveyor 42. Further sprockets 110, 112 for the chain 102 are used to take up chain slack when the main conveyor 42 is raised for transport. Sprocket 112 is carried by a lever 114 biased by spring 116 to take up the slack as the main conveyor is raised. A clutch engagement lever 118 extends to a clutch (not shown) to engage or disengage drive from the main conveyor 42 and from the output shaft 66 for the rear drive wheel 16.

The chain 108 which drives the main conveyor 42 extends around a sprocket 120 mounted on an end shaft 122 of the main conveyor. The end shaft 122 carries a further sprocket 124 which drives a chain 125 extending around a sprocket 126 mounted on an end shaft 127 of the second conveyor 78. Shaft 127 also rotatably supports bearings (not shown) which in turn support the frame of second conveyor 78. Thus the second conveyor 78 may pivot upwardly and downwardly without affecting its drive and always operates at the same speed as the main conveyor 42.

In addition, it will be seen (FIG. 1) that the output shaft 66 also drives the center rear drive wheel 16, through chain 128, sprockets 129, 130, chain 132, and sprocket 134 fixed to axle 18. Thus the main conveyor 42 and the second conveyor 78 are always operated in synchronism with the ground speed. In practice, the sprocket ratios are adjusted so that the main and second conveyors 42, 78 always operate approximately at the ground speed of the machine (assuming that the rear drive wheel 16 is not spinning).

The front conveyor 92 is driven (FIG. 7) by a sprocket 136 and chain 138. The tension of the chain 138 is controlled by adjuster 140. The chain 138 is driven by sprockets 142, 144 and a chain 146 connected to a sprocket 148 on a hydraulic motor 150. The hydraulic motor 150 is driven by the hydraulic pump 68 connected to the gearbox 64. The bottom conveyor 86 is driven by chain 152 and sprockets 154, 156. The chain 152 is tensioned by adjuster 158. The sprocket 154 is mounted on the same shaft 160 as sprocket 136, and the sprocket teeth ratios are arranged so that the bottom conveyor 86 always operates at the same or approximately the same speed as the front conveyor 92. The bottom conveyor 86 and front conveyor 92 are normally operated at slightly greater than ground speed, since the sod usually stretches as it is being conveyed and rolled.

Motor 150 is normally a variable speed motor. Typically it is a piston-swash plate motor so that the volume of the motor can be changed by varying the swash plate angle. The swash plate angle is adjusted by a hand wheel on the motor or by any other conventional control. Such motors are conventional.

When such a motor is used, then the pump 68 will deliver a certain amount of hydraulic fluid to the motor, dependent on the ground speed of the machine. As the ground speed varies, the speed of motor 150 and hence that of the bottom conveyor 86 and front conveyor 92 vary in synchronism. However additional speed variation of the bottom and front conveyors 86, 92 can be superimposed on their normal speed by adjusting the speed of variable speed motor 150 (by adjusting its swash plate angle). If the volume of the motor is increased, then the motor will operate at a lower speed. If the motor volume is decreased, then the motor will operate at a higher speed. For strong sod the speed of motor 150 is increased, to roll the sod more tightly. For weak sod, such as that harvested in the spring time or which does not have well established roots and which is more likely to break, the speed of motor 150 is reduced slightly, to reduce the tension in the sod. The sod roll is then formed slightly less tightly, but with greater assurance that it will not contain breaks. Typically the speed adjustment, which is superimposed on the normal speed which is synchronized with the ground speed of the machine, need be only two or three percent. It is found that this small speed variation makes a large difference in helping to ensure that the rolled sod does not contain breaks.

Figure 4:
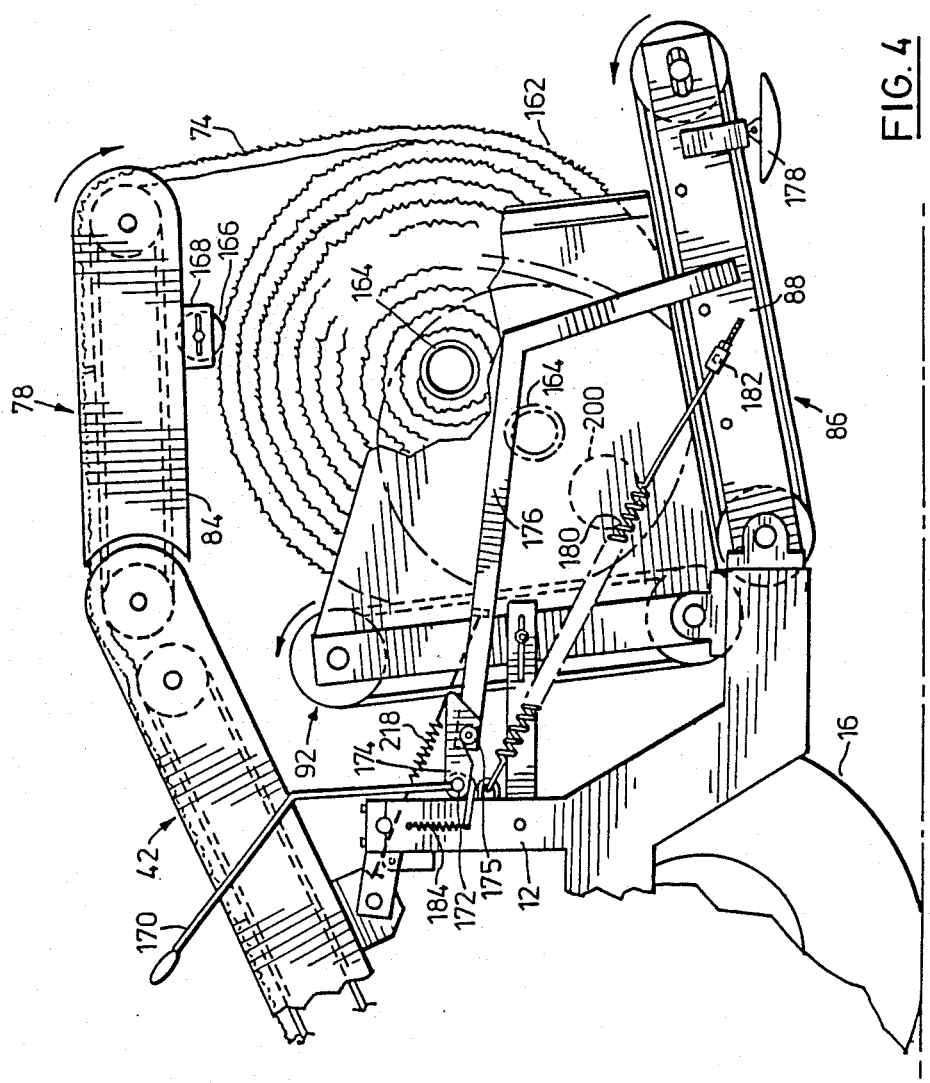
FIG. 4 is a side view of a portion of the harvester of FIG. 1, showing the sod roll partly formed.

The operation of the harvester as so far described is as follows, with reference to FIGS. 1 to 7. As the harvester moves forward along the ground, sod is conveyed up the main conveyor 42. When the sod passes the rear end of the main conveyor 42, it travels downwardly over the second conveyor 78, drops off the end of the second conveyor 78 (FIG. 3), travels forwardly over the bottom conveyor 86 (the upper surface of which is moving forwardly) and is then carried upwardly by front conveyor 92 (the rear surface of which moves upwardly). This initiates a sod roll, indicated at 162 in FIG. 3, about a central core tube 164 which is inserted by means to be described. As the roll 162 grows, as shown in FIG. 4, the second conveyor 78 is lifted by the growing roll. In order to maintain clearance between the second conveyor 78 and the roll being formed, a clearance idler roller 166 (FIG. 4) is mounted on brackets 168 attached to the bottom of the second conveyor frame 84.

Each sod roll 162 will normally contain a preset length of sod. When such length has been undercut, a conventional crosscut mechanism (not described since it does not form part of the invention) makes a crosscut in the sod just ahead of the undercutting blade 40. (The measuring if desired may be manual.) When the cut end reaches the sod roll 162, the operator of the machine rotates a drop lever 170 counterclockwise (FIGS. 3, 4, 5).

The drop lever 170 rotates a cross shaft 172 (see also FIG. 2) counterclockwise. The cross shaft 172 carries at each end a latch 174. Each latch 174 (see FIG. 4) normally engages a pin 175 projecting outwardly from the side of an L-shaped support arm 176, one fixed to each side of the bottom conveyor frame 88. This allows the bottom conveyor 86 to pivot clockwise from the position shown in FIG. 4, about its pivot shaft 90, discharging the roll of sod as shown in FIG. 5. The rear end of the bottom conveyor 86 is held clear of the ground at this time by drop pads 178 one fixed to each side of the bottom conveyor frame 88. When the sod roll 162 has been discharged, two return springs 180, each having one end pivotally connected at 182 to the bottom conveyor frame 88 and its other end connected to the main frame 12, return the bottom conveyor 86 to its normal raised position as shown in FIG. 4. (The return springs 180 have sufficient tension to lift the bottom conveyor alone but not with the heavy roll of sod on the bottom conveyor.) The bottom conveyor is again retained in its raised position by the latches 174, which are returned to their normal latching position by a latch return spring 184 (FIGS. 4 and 5).

Figure 5:
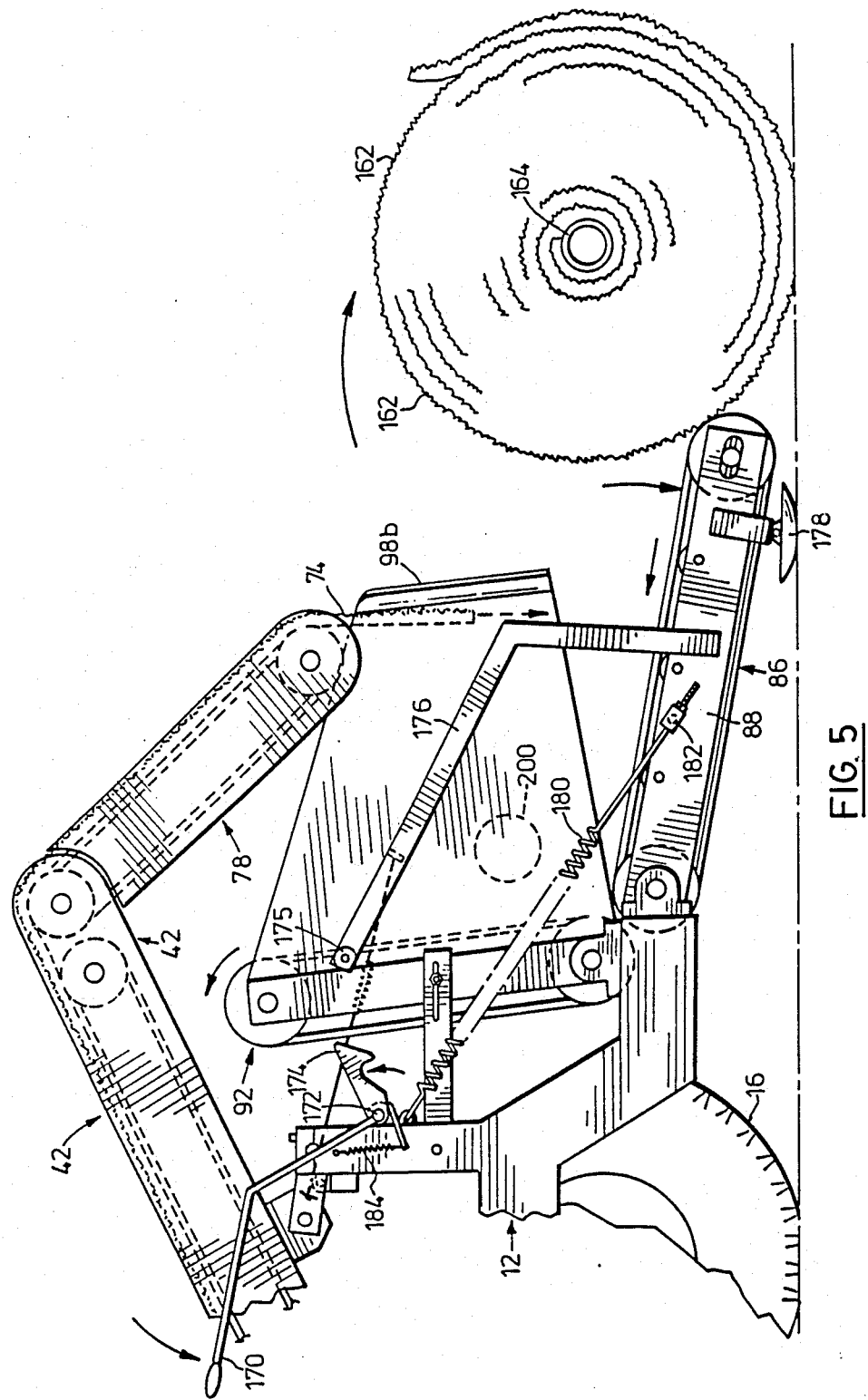
FIG. 5 is a side view similar to that of FIG. 4 but showing the sod roll completed and in the process of being discharged.

While the sod roll is being discharged, sod continues to travel up the main conveyor 42, down the second conveyor 78 and to drop into the sod roll forming box 76 as shown in FIG. 5. There is no need to interrupt the operation of the machine or to terminate the cutting of sod as the roll is discharged.

It will be noted that the process just described forms rolls of sod with the grass side facing outwardly. This protects the roots of the grass plants against drying. It is also found that this form of sod roll is particularly well adapted to automated laying. In addition, it will be noted that the distance over which the sod must fall from the end of the second conveyor 78 to the bottom conveyor 86 or to the sod roll 162 is at all times relatively limited. This is important, because freshly cut sod is both heavy and extremely fragile. If the sod were required to fall through a long distance unsupported, it would frequently break. While the machine will continue to roll the sod even though breaks may occur, nevertheless laying is facilitated if there are few or no breaks in the sod roll. The vertical drop through which the sod must travel unsupported is limited because, when the sod roll is initially being formed as shown in FIG. 3, the second conveyor 78 hangs down steeply because of the weight of the sod travelling over it which overcomes its bias springs 80. When the sod roll is partly formed, the second conveyor 78 is lifted by the sod roll and the vertical distance over which the sod must fall is again limited, as shown in FIG. 4.

If desired, the second conveyor 78 can be formed simply from a flat plate or a set of rods, rather than a driven belt. If extra friction is needed between it and the sod travelling over it (to reduce the pull of gravity on the sod), downwardly spring biased rods can be mounted above the second conveyor 78 to force the sod travelling over conveyor 78 against the conveyor 78. "Conveyor" thus includes a conveying surface as well as a powered conveyor.

Figure 8:
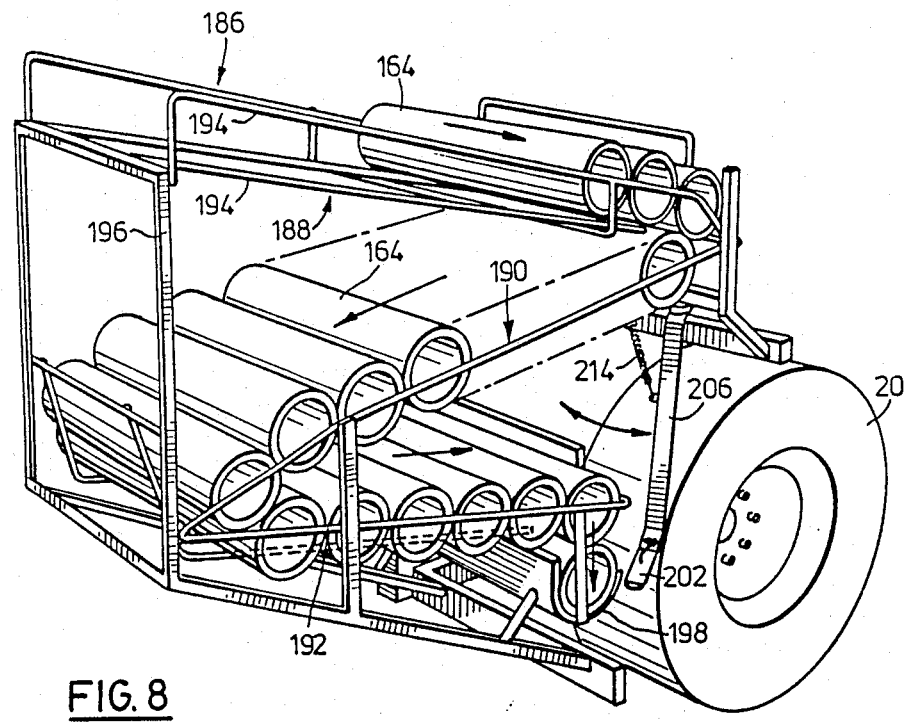
FIG. 8 is a perspective view of a core tube storage rack and a portion of the injector mechanism for the sod harvester of FIG. 1.

When sod rolls are being formed, it is often desirable to include a core tube 164 therein so that the rolls may be more easily handled by automatic laying equipment. FIG. 8 shows a rack generally indicated at 186 which is carried by the main frame 12 of the machine and which stores core tubes. The rack 186 includes an upper forwardly sloping storage section 188, an intermediate storage section 190 which slopes rearwardly and downwardly from the lower end of the upper storage section 188, and a lower storage section 192 which slopes forwardly and downwardly from the lower end of the intermediate storage section 190. All three storage sections are formed by rods 194 as shown, supported by frame members 196, so that the core tubes 164 will roll from the upper to the intermediate and then to the lower storage section 192 as the core tubes are used.

In use, the lowest core tube 164 on the rack 186 falls into a trough 198 (FIGS. 8 and 9) which is aligned with a hole 200 (FIGS. 2 and 9) in the side plate 98a of the roll forming box 76. An automatic tube injector mechanism is provided to inject the core tube 164 in the trough 198 through the hole 200 into the roll forming box 76 just after a sod roll 162 has been ejected.

Figure 9:
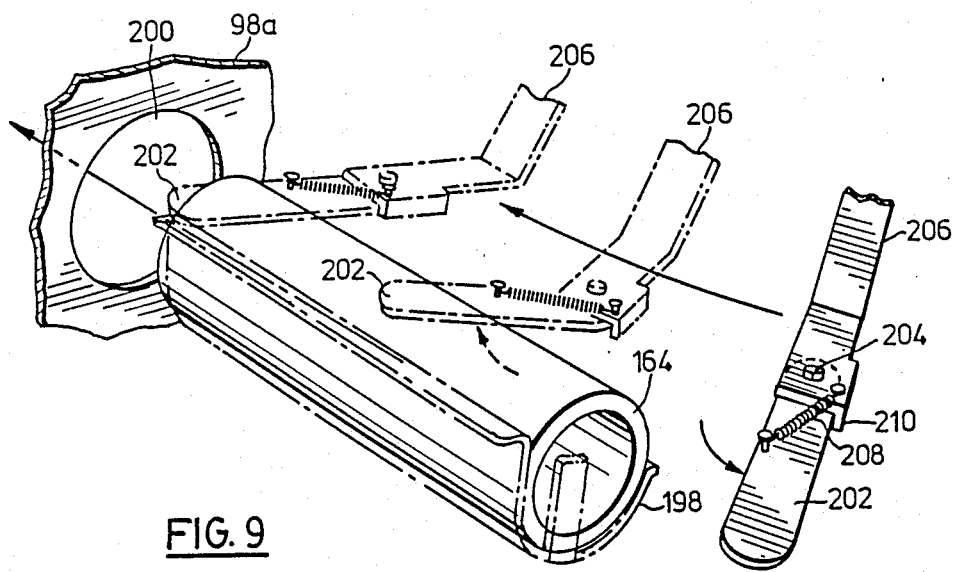
FIG. 9 is a perspective view showing a core tube being injected by the injector mechanism.

The tube injector mechanism (FIGS. 2, 2A, 9) includes an end arm 202 pivotally mounted at 204 to a support arm 206. The end arm 202 is biased to an extended position as shown in FIG. 9 by spring 208 and stop 210 but can fold sidewardly as shown in chained dotted lines in the central view in FIG. 9. The support arm 206 extends forwardly to a pivot 212 mounted on the main frame 12. The support arm 206 is biased inwardly by a spring 214 connected between the arm 206 and the main frame 12. A chain 216 is connected to the end of the support arm 206 and extends rearwardly to a stiff coil spring 218, the other end of which is attached to a tab 220 on one of the L-shaped support arms 176. Inward and outward movement of arm 206 is limited by stops 221a, 221b (FIG. 2A) respectively.

The operation of the automatic tube injector mechanism is as follows. Normally the tube injector arms 202, 206 have the position shown in FIG. 2 and in the left hand chain dotted lines in FIG. 9. When a roll of sod is being discharged, the bottom conveyor 86 drops downwardly, pivoting the L-shaped support arms 176 counterclockwise as drawn in FIG. 2. This pulls the chain 216 rearwardly, swinging the support arm 206 outwardly to the chain dotted position shown in FIG. 2 (also shown in full lines in FIG. 9). As the arm 206 moves outwardly, the end arm 202 folds (shown in the central depiction in FIG. 9) as it is moved from left to right in FIG. 9. In the outer position of arms 202, 206, shown chain dotted in FIG. 2, and in full lines in FIG. 9, the injector arms 202, 206 are now cocked and ready to inject a tube 164.

When the sod roll 162 has been discharged, the bottom conveyor 86 returns to its raised position shown in FIG. 2, releasing the tension on chain 216. The return spring 214 then pulls the support arm 206 inwardly to the full line position shown in FIG. 2. The end arm 202 then injects the tube 164 in trough 198 through the hole 200 into the sod roll forming box 76, where it falls and is carried forwardly and downwardly to the position shown in FIG. 3, in readiness to act as a core for a new roll of sod. Because the hole 200 is above the upper surface of the bottom conveyor 86, the tube 164 falls when it is injected and cannot therefore bounce back out through hole 200.

The spring 218 simply provides some "give" in chain 216 in case the bottom conveyor 86 drops into a hole when it is lowered and thus pulls arm 206 hard against stop 221b. Spring 218 prevents arm 206 from being bent when this occurs. In normal use spring 218 does not stretch appreciably.

Because the core tubes are injected automatically in a manner described, there is no need to stop the sod harvesting operation while the operator inserts a fresh core tube. Other methods of injecting core tubes may also be employed; e.g. they can be stored in a box at the side of the machine and fed or dropped into the top of roll forming box 76 using an arm or cylinder.

It will be realized that for strong, relatively dry sod, no core tubes may be needed. Alternatively, short core tubes may be used, not extending to the ends of the roll, or short core tube sections may be used one at each end of the roll. The core tubes need not be circular in cross-section; they can be square, or in some cases even flat.

As rolls of sod are formed, the weight on the rear of the machine increases and that on the front of the machine decreases. To reduce this undesirable effect, during harvesting the outrigger cylinders 26 are left floating, and the springs 28 pull down on the outer rear wheels 20 with about 400 pounds pressure, in effect lifting the rear of the machine and reducing the load on the rear drive wheel 16. When the machine reaches the end of its travel and is to be stopped, if there is any sod left on the conveyor, the outrigger cylinders 26 are operated to lower the outer rear wheels 20, thus lifting the drive wheel 16 clear of the ground. The conveyor system can then be operated to remove the remaining sod therefrom, while the central drive wheel simply spins clear of the ground. Alternatively, a separate clutch may be provided for the conveyor system.

It will be evident that the rear end of the second conveyor 78 should be located forwardly of the rear end of bottom conveyor 86. Otherwise, sod from the second conveyor 78 could miss the bottom conveyor 86 and fall onto the ground. Preferably the rear end of second conveyor 78 is located forwardly of the rear end of the sod roll 162 when fully formed (to minimize the vertical distance over which the sod falls) but rearwardly of the axis of the roll. In any event the second conveyor 78 should always drop the sod 74 rearwardly of the tube 164 (after the tube has been injected and moved to the front of bottom conveyor 86). In addition the bottom conveyor 86 should extend rearwardly of the fully formed sod roll so that if there is a break in the sod, conveyor 86 will catch the sod supplied by conveyor 78.

It will further be noted that because the sod is dropped into the sod roll forming box 76 from above, and because the rear end of the box is open, removal of the roll of sod from the machine, without stopping the machine, is facilitated. Removal is also helped by the fact that the upper surface of the bottom conveyor 86 travels in the same direction as the direction of travel of the harvester, so that the sod roll 162 is rotating in the correct direction for discharge.

Figure 9A:
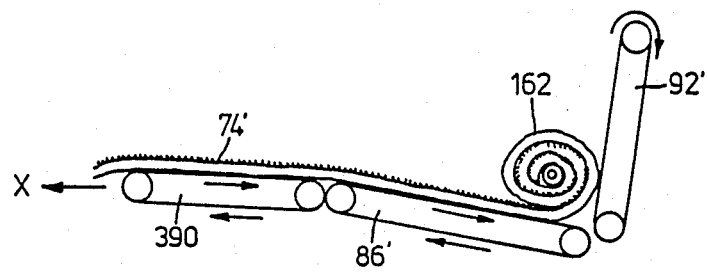
FIG. 9A is a diagrammatic side view of a modified conveyor arrangement.

If desired, particularly if the sod is to be rolled grass side in, the bottom and front conveyors 86, 92 can be rearranged as shown at 86', 92' in FIG. 9A, and the sod can enter via conveyor 390 as shown at 74', with its grass side up. The direction of rotation of the conveyors is indicated by the arrows thereon, and the direction of travel of the harvester is indicated by arrow X. The arrangement shown in FIG. 9A is somewhat less preferred since the conveyor 92' (which is now a rear conveyor) must be lifted out of the way to discharge a sod roll. In addition the sod roll is more likely to unroll slightly when it is discharged.

Figure 9B:
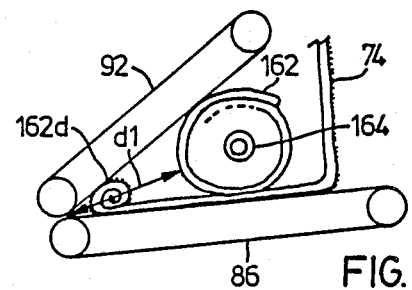
FIG. 9B is a diagrammatic side view of an undesirable conveyor arrangement.

In all cases, the bottom conveyor 86, 86' should slope downwardly toward its intersection with front conveyor 92 or 92'. This allows the weight of the sod to compress the roll into a tight roll as it forms. The front conveyor 92, 92' should be vertical or can slope slightly away from the bottom conveyor so that the angle between the two conveyors is a right angle or nearly a right angle. If the angle between the two conveyors were acute as shown in FIG. 9B, then if a break occurs in the sod while it is being harvested, a secondary roll 162a will form in front of the main roll 162, instead of the sod continuing to add to the main roll. This would create unsaleable sod, since each sod roll must contain a standard length of sod. In addition the secondary roll of sod 162a, as it grows, tends to try to eject the previous roll 162, which can cause jamming.

Figure 9C:
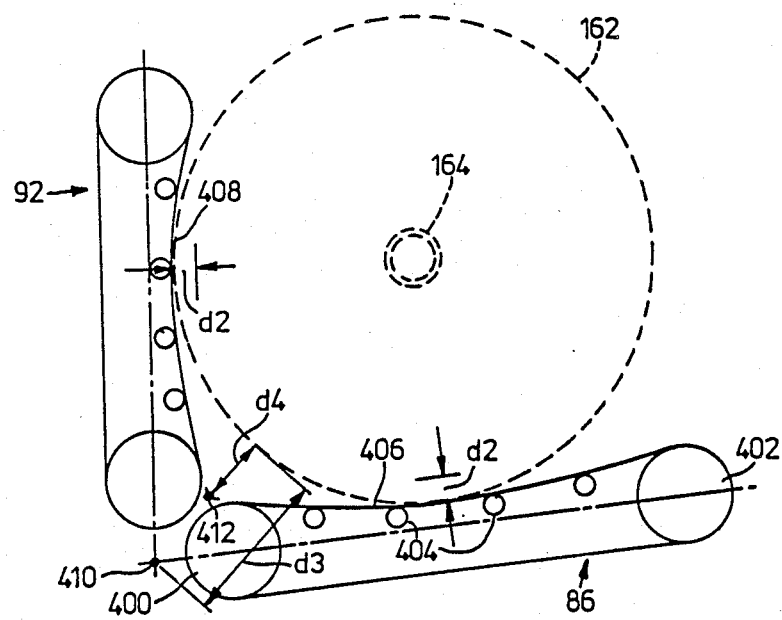
FIG. 9C is a diagrammatic side view of rollers in a conveyor arrangement according to the invention.

It is in general desirable to keep the dimension d1 (FIG. 9B) between the forming sod roll and the intersection of the conveyors 86, 92 as small as possible, to prevent secondary sod rolls from forming when breaks occur in the sod being harvested. (Dimension d1 is measured in a direction along a radius of the sod roll.) Therefore, as shown in FIG. 9C, the bottom conveyor 86 is formed with end rollers or sprockets 400, 402 and with intermediate rollers 404 which allow a cavity or cradle 406 to form in the upper surface of the bottom conveyor 86. The front conveyor 92 is similarly formed to provide a cavity or cradle 408 in its rear surface. The depth d2 of each cavity or cradle 406, 408 varies directly with the size of the sod roll 162 to be formed. For a 36 inch diameter roll dimension d2 should be between two and three inches. The cavities 406, 408 allow dimension d1 to be kept small as the sod roll grows, thus reducing the likelihood that secondary sod rolls can form.

In a preferred embodiment of the invention, imaginary lines extended through the centers of the sprockets of the conveyors 86, 92 met at a point 410, and it was found that the distance d3 from point 410 to the surface of a fully formed 36 inch roll (taken normal to the roll) was 8.5 inches. If the surfaces of conveyors 86, 92 were extended in imaginary planes to meet at 412, the distance d4 from 412 to the surface of the fully formed 36 inch roll 162 was only 3.5 inches. Therefore, there was very little space for a secondary roll to form.

The angle between conveyors 86 and 92 was preferably between 90 and 95 degrees. Conveyor 86 should slope forwardly and downwardly (at about 10 degrees in a preferred embodiment) to ensure that the roll 162 rolls downhill to keep it tight. Conveyor 92 should lean forwardly slightly (i.e. away from the vertical and away from conveyor 86) to allow a larger main roll to be formed, with minimum space for an undesired secondary roll to form. However if conveyor 92 leaned too far from the vertical, the sod roll could tend to climb up it, which would be highly undesirable. Conveyor 92 in a preferred embodiment leans forwardly at an angle of about 15 degrees from the vertical.

Figure 6:
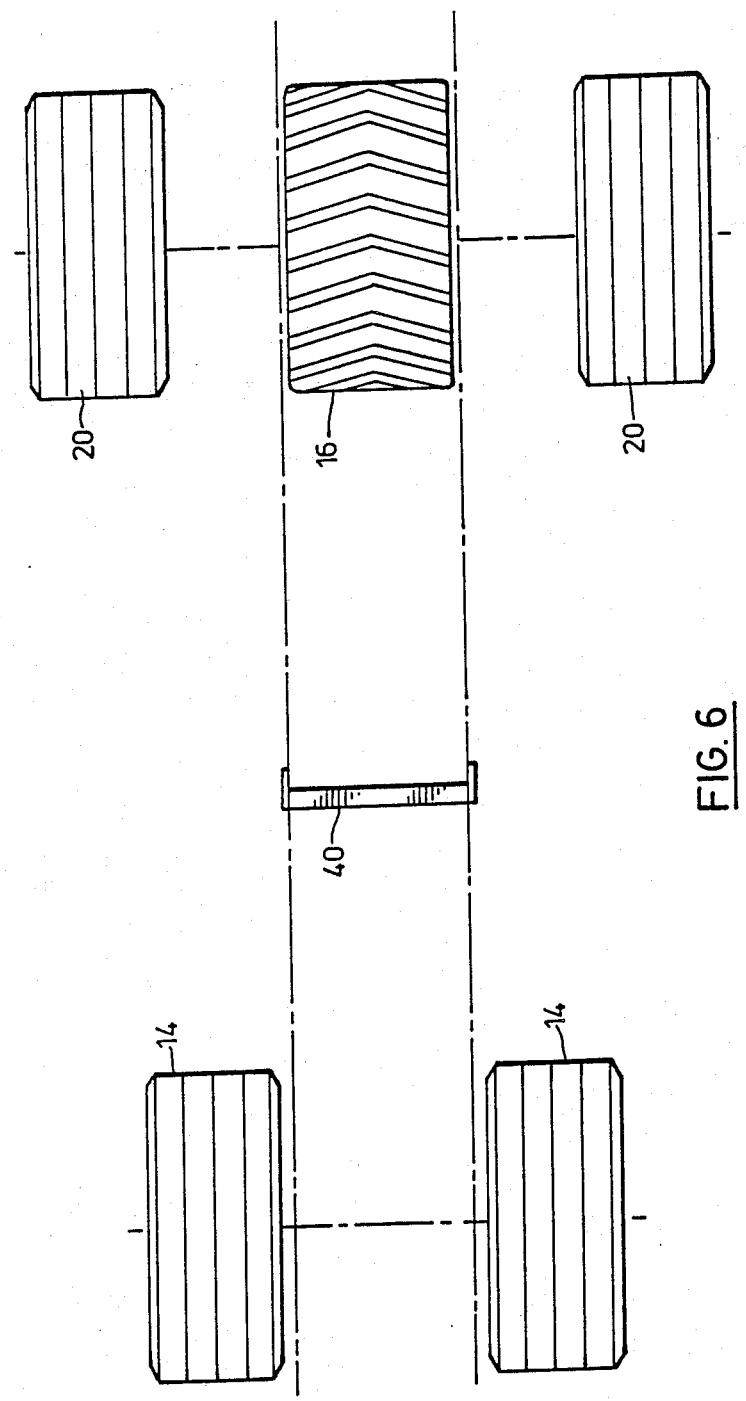
FIG. 6 is a diagrammatic view showing the arrangement of wheels and cutter blade of the FIG. 1 sod harvester.
Figure 13:
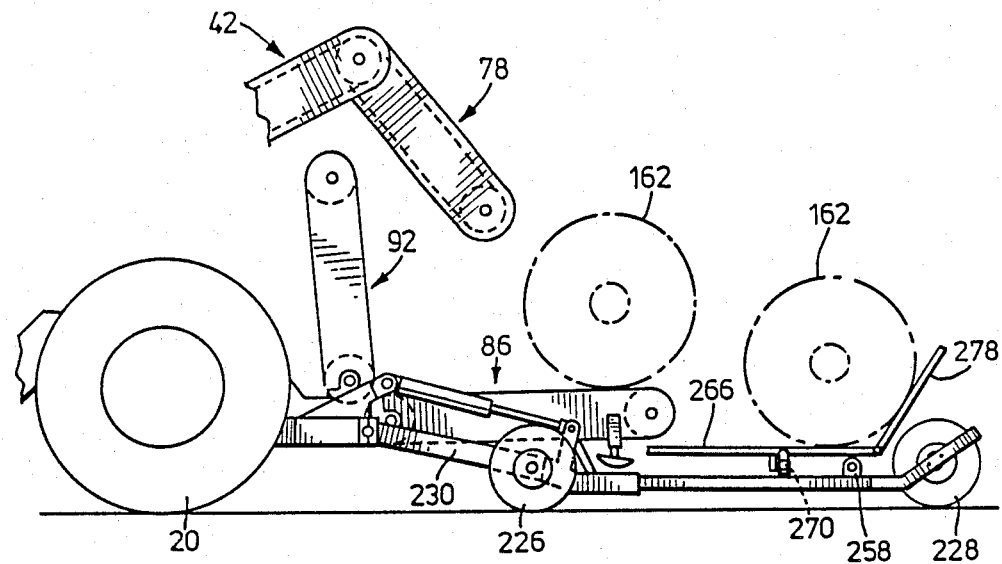
FIG. 13 is a diagrammatic side view of the cart of FIG. 10 in position on the sod harvester of FIG. 1 and showing a sod roll being discharged from the harvester to the cart.
Figure 14:
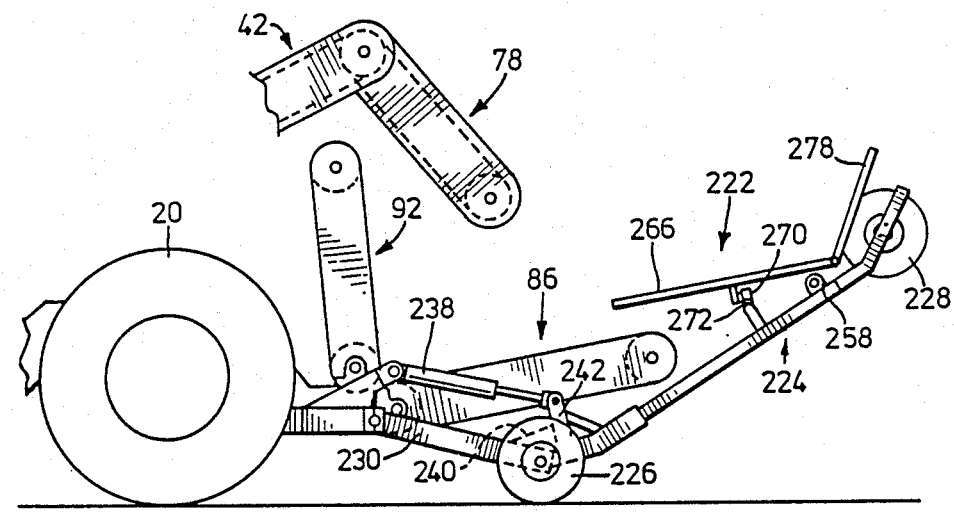
FIG. 14 is a view similar to that of FIG. 13 but showing the cart in the beginning stages of its stored position.
Figure 15:
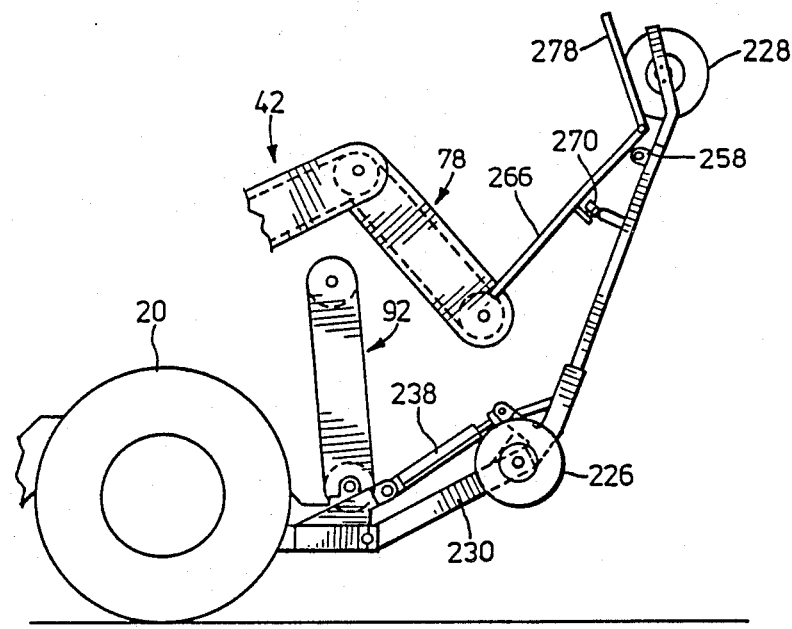
FIG. 15 is a view similar to that of FIG. 14 but showing the sod cart in its fully stored position.

As the machine travels back and forth on a field of sod to be cut, the front wheels 14 and outer rear wheels 20, which overlap as shown in FIG. 6, roll the sod to be cut, improving its strength before cutting. It is desirable, during this procedure, to ensure that discharged rolls of sod do not obstruct the path of the machine. Therefore means have been provided, as shown in FIGS. 10 to 15, to discharge the sod rolls 162 sufficiently far to the side of the machine that such rolls will not interfere with future passes of the machine. As shown in FIGS. 10 to 15, a rear cart 222 is provided. The rear cart 222 includes a frame 224 carried by two side wheels 226 and a central rear wheel 228. The frame 224 is pivotally mounted to the rear of the main frame 12 of the harvester by rearwardly extending swing arms 230 pivotally connected to front extensions 232 from frame 224 at the axis of axles 234 and pivotally connected at pivot shafts 236 to the rear of frame 12. The frame 224 can thus be folded upwardly by cylinders 238 to the stowed position shown in FIG. 15, to shorten the harvester for travelling. During folding, the frame 224 folds upwardly as shown in FIG. 14 until stops 240 on the rear ends of swing arms 230 engage struts 242 on the frame 224. (The struts 242 are connected to the rod ends of cylinders 238). The swing arms 230 then lift upwardly as shown in FIG. 15, raising the cart steeply off the ground.

The cart frame 224 includes (FIG. 10) four corner sprockets 244, around which extend a chain 246. The chain 246 passes around three front sprockets 248, 250, 252. Sprocket 252 is driven by a hydraulic drive motor 254.

Figure 10:
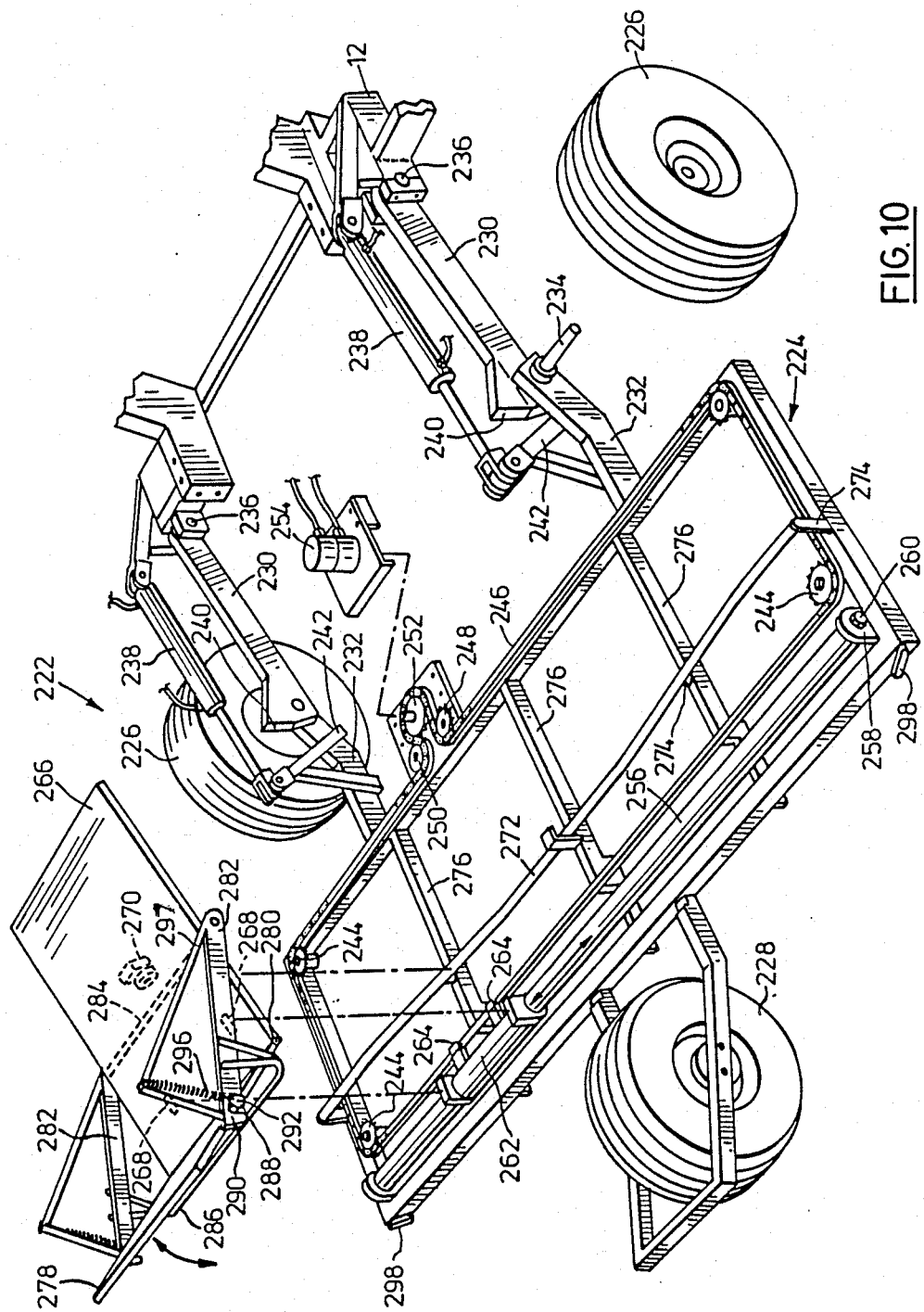
FIG. 10 is a perspective view partly exploded, showing a rear sod roll cart for the harvester of FIG. 1.

A smooth rod 256 extends across substantially the entire width of the cart 222, at the rear of the cart, and is secured by brackets 258 and bolts 260. A sleeve 262 is slideably and rotatably mounted on rod 256. The sleeve 262 is attached to the chain 246 at attachments 264 and is welded to the bottom of a tilting platform 266 at attachment points 268. The front of the platform 266 is supported by a roller 270 mounted on the bottom of the platform 266 and riding on a transverse cam rail 272 which as shown in FIG. 10 is low at its center and which rises at its ends. The rail 272 is mounted by supports 274 attached to cross members 276 of the frame 224.

The platform 266 includes a rear gate 278 pivotally mounted by hinge 280 at the rear edge of the platform 266. The gate 278 is normally latched in the raised position shown in FIGS. 10 and 11 by two latch arms 282, one at each side of the gate 278. The latch arms 282 are fixed together and pivotally mounted on the platform 266 by axle 284. A cam follower rod 286 extends below the gate 278 and is bent upwardly at its sides and secured to the latch arms 282. Latch pins 288 extend outwardly from the side edges of the gate 278 into the slots 290 in the latch arms 282. Retainer tabs 292 (FIG. 11A) are pivotally connected by bolts 294 to the ends of latch pins 288. Bias springs 296 extend upwardly from retainer tabs 292 to arms 297 fixed to and extending above the latch arms 282, and normally bias the gate 278 to its closed position.

In use, the cart 222 operates as follows. Normally the chain 246 is operated to move the platform 266 to a central position transversely of the cart 222, i.e. to the low central section of the cam rail 272. In this position, when sod rolls 162 are discharged from the bottom conveyor 86, they roll rearwardly onto the cart 222 and onto the platform 266 as best shown in FIG. 13. There, they are held against discharge by the gate 278. When the roll is to be discharged from the cart 222, the chain 246 is operated to move the platform 266 to either side of the cart.

Figure 11:
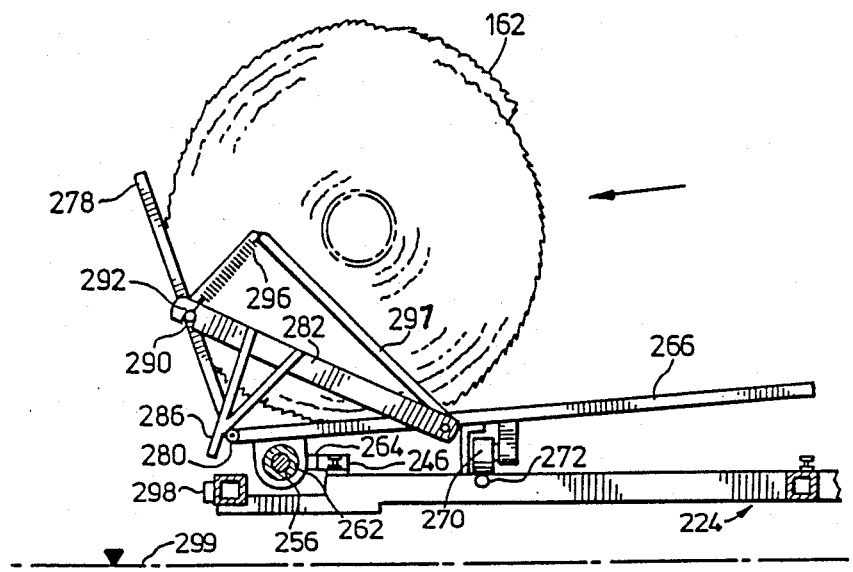
FIG. 11 is a side view of a portion of the cart of FIG. 10 showing the sod roll on the cart.
Figure 11A:
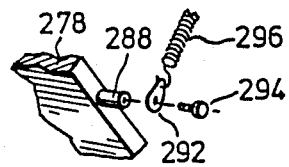
FIG. 11A is a perspective view showing latch pins of FIG. 11.
Figure 12:
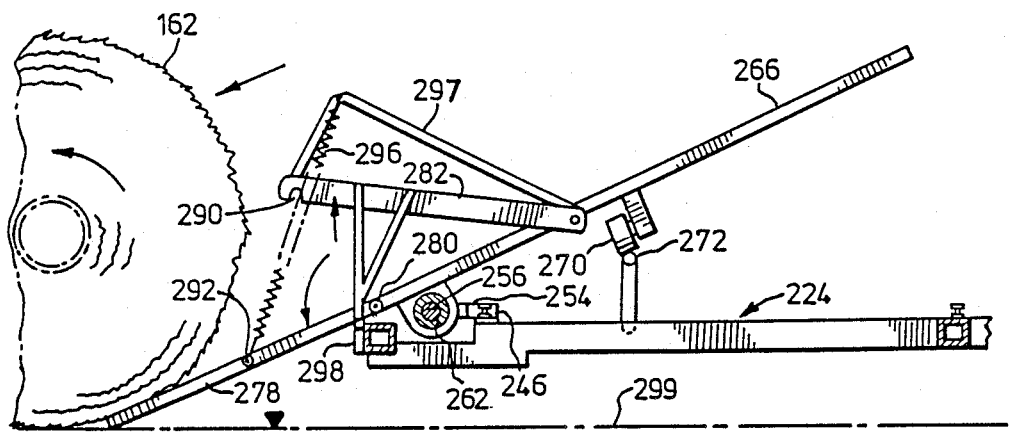
FIG. 12 is a view similar to that of FIG. 11 but showing the sod roll in the process of being discharged.

When the platform 266 is moved to one side of the cart, the raised cam rail 272 at each side of the cart pushes the roller 270 and hence the bottom of the platform 266 upwardly as shown in FIGS. 11 and 12. This causes the platform 266 to tilt from a horizontal position to a sharply rearwardly tilting position as shown in FIG. 12. At the same time, the cam follower rod 286 is forced upwardly by one of the unlatching cams 298 (FIGS. 10, 12) on each side of the rear surface of the cart rear frame member 300. This lifts the latch arms 282 clear of the pins 288. The weight of the sod roll 162 on the rear gate 278 then allows the rear gate to tilt rearwardly, permitting the sod roll 162 to be discharged onto the ground 299. The cart is wide enough to move the sod roll sufficiently far to the side that when the harvester makes its next pass, the harvester will be clear of the sod roll which has been discharged. This permits continuous sod harvesting operation without the need to have an additional person removing from the path of the machine the rolls of sod as they are formed.

When the cart 222 is folded as shown in FIG. 15, the platform 266 is first moved to one side of the cart, to avoid interference with the centrally located conveyors 78, 86.

It will be appreciated that various changes can be made in the machine as described while still utilizing the spirit of the invention. For example the second conveyor 78 can be replaced by a set of spring fingers which will pivot in the same manner as the second conveyor 78 and which support the sod as it drops into the roll forming box 76 to minimize the free unsupported vertical drop of the sod. Such spring fingers also constitute conveyor means, the power being supplied by gravity. Alternatively, instead of having a movable second conveyor 78 or spring fingers which adjust its position as the roll of sod is formed, the second conveyor 78 can be fixed in position and the bottom conveyor 86 can be raised and lowered as required, as the sod roll is formed. However this latter arrangement is not preferred since it is more complex and costly.

If desired, and in order to avoid the need for the cart 222, the sod rolls can be discharged at an angle to the path of travel of the machine, as indicated in the diagrammatic views of FIGS. 16 and 17. As shown in FIG. 16, a short extra conveyor section 301 is inserted between the cutting mechanism 36 and the main conveyor 42. The conveyor section 301 has a curve therein so that sod is discharged at an angle (typically 30 degrees) sufficient for the discharged roll to be clear of the path of travel of the machine on the machine's next pass. The input and output of the conveyor section 301 are at the same level, and the remaining conveyor sections are unchanged. However the frame of the machine, diagrammatically indicated at 302, is widened to accommodate the curve. Typically, to cut a strip of sod 24 inches wide, the machine is now about 8 feet wide.

The conveyor 301, shown diagrammatically in FIG. 17, has an upwardly curved portion 304 extending along its inside radius 306. This permits the distance which the sod travels along the inside radius 306 to be the same as the distance which the sod travels along the outside radius 308, so that the sod will not become stretched and torn along the outside radius, nor will it become overlapped along the inside radius as it negotiates the curve. In other words, the distance along conveyor section 301 from its input to its output is constant across the entire width of conveyor section 301.

When the sod rolls are discharged at an angle to the path of the machine, they will be out of the way of subsequent passes of the machine throughout most of the cutting process.

When the conveyor shown in FIGS. 16 and 17 is used, it is found that the downward slope from the inside radius 306 to the outside radius 308 can be relatively steep, particularly at the apex of the upwardly curved portion 304. Typically the slope may be about 30°. To prevent the sod from sliding sideways down the slope, it is preferred to attach L-shaped metal pieces 310 (FIG. 17) to the outside edge 308 of the conveyor 301. The L-shaped metal pieces 310 are typically each about 2 inches high, one inch wide (in the direction of movement of the conveyor), about ⅛ inch thick, and are spaced approximately 2 inches apart in the direction of movement of the conveyor. Since they are thin, they are typically bolted or riveted by rivets 312 to the top of the conveyor surface.

In addition, in order to prevent the belt of conveyor 304 from attempting to straighten itself, side idlers (not shown) are placed on both outside ends of the end shafts of the conveyor and on a shaft at the inside edge 306 of the conveyor at or near the center (lengthwise) of the conveyor section 301.

While only the upper run of the conveyor section 301 is shown in FIGS. 16 and 17, it will be realized that in the lower run of this conveyor, the inside and outside edges must also be equal in length. While this could be achieved by providing a downwardly curved portion at the center of the lower run of the conveyor (as a mirror image of upwardly curved portion 304), this would usually interfere with the ground clearance of the machine. Therefore the lower run of the conveyor 301 is at its inside edge typically extended downwardly to a limited extent at the ends and then upwardly between the ends, to ensure that the inside and outside edges of the lower run are equal in length without taking up too much vertical height.

The arrangement shown in FIGS. 16 and 17 has the important advantage that it eliminates the need for the cart 222 shown in FIGS. 10 to 15. Without the cart the machine is shorter, lighter, more manoeuverable, and less costly. In addition the arrangement shown in FIGS. 16 and 17 redirects the sod before the roll is formed, in contrast to the cart 222 which is required to move a large roll sideways after the roll has been formed. Since the sod must be conveyed in any event from the cutter to the sod roll up enclosure, it is much less costly to move the strip of sod sideways during this process, rather than to move the heavy roll later. The conveyor section 301 also of course serves, like conveyor 42, to convey the cut sod upwardly, since conveyor section 301 is preferably tipped upwardly from its front to its back end.

While the harvester with the curved conveyor section is slightly wider than previously, it has been found possible to reduce the width of the machine from 8 feet to about 7 feet 6 inches to cut a strip of sod 24 inches wide. This is only 6 inches wider than the machine would normally be without the curved conveyor section.

The fact that the sod rolls will normally be clear of subsequent passes of the harvester can best be appreciated by considering arrows 314, 316 and 318 in FIG. 16. Arrow 314 indicates the direction of travel of the harvester. Arrow 316 indicates of width of bottom conveyor 98a. If the angle at which the sod has been redirected is 30° with respect to the direction of travel 314 of the machine, then arrow 318 (which is perpendicular to the direction of travel) forms with arrow 316 two sides of a right angled triangle the upper angle of which is also 30°. If the width of conveyor 98a and hence the length of arrow 316 is 24 inches, then the length of arrow 318 will be 20.78 inches.

Therefore if the harvester on its next pass moves toward the top of the sheet as drawn by 24 inches (the width of the sod cut), since this exceeds the length of arrow 318 by more than 3 inches, the harvester will be clear of the last roll of sod which has been dropped off. In practice the width of conveyor 98a is slightly more than the 24 inch width of the sod, but the difference is sufficiently small that on its next pass the harvester is still clear of the sod roll which has been dropped off.

We claim:

1. A sod harvester adapted for travel along a path of travel and comprising:
   (a) means for undercutting sod,
   (b) first conveyor means for conveying cut sod to a raised position and discharging said sod from said raised position,
   (c) a sod roll forming enclosure below said raised position,
   (d) second conveyor means located in said sod roll forming enclosure for forming a roll of sod,
   (e) at least one of said first and second conveyor means being movable toward and away from the other,
   (f) and means responsive to the presence of sod on said first conveyor means for automatically adjusting the relative distance between said first and second conveyor means by moving one of such conveyor means toward the other to reduce the distance through which sod must drop unsupported from said first conveyor means to said second conveyor means, whereby to minimize breakage of said sod as it is formed into a roll.

2. A sod harvester according to claim 1 wherein said first conveyor means includes a main conveyor section extending from said undercutting blade to a position adjacent and above said roll forming enclosure, and an end conveyor section pivotally connected to said main conveyor section and extending downwardly therefrom, said end conveyor section being biased upwardly such that the weight of sod passing thereover will pivot said end conveyor section downwardly toward said second conveyor means.

3. A sod harvester according to claim 2 wherein said second conveyor means comprises a bottom conveyor pivotally connected to the frame of said harvester and retaining means normally securing said bottom conveyor in a position slanting upwardly toward said end conveyor section.

4. A sod harvester according to claim 3 and including latch means for unlatching said retaining means so that the weight of a sod roll on said bottom conveyor will tilt said bottom conveyor downwardly to discharge such roll of sod.

5. A sod harvester according to claim 1 wherein said first conveyor means includes a conveyor section therein for redirecting the horizontal component of the direction of travel of cut sod from a first direction parallel with the path of travel to a direction disposed at an angle to said first direction.

6. A sod harvester according to claim 5 wherein said conveyor section includes an inner radius side and an outer radius side, said inner radius side being curved vertically so that the distance along said conveyor section between its ends is constant across the width of said conveyor section.

7. A sod harvester according to claim 1 wherein said second conveyor means comprises a bottom conveyor sloping upwardly and rearwardly, a front conveyor extending generally vertically, the ends of said bottom and front conveyors being in close proximity to each other to form an apex and said bottom and front conveyors defining substantially a right angle between them, the upper surface of said bottom conveyor having a concavity therein to reduce the distance between the periphery of said sod roll and said apex.

8. A sod harvester according to claim 7 wherein the rear surface of said front conveyor also has a concavity therein to reduce said distance.

9. A sod harvester according to claim 1 wherein said harvester is adapted to be driven along the ground at a ground speed, drive means responsive to said ground speed for normally driving said second conveyor means at a second speed which is synchronized with said ground speed, and manually operable adjustment means connected to said drive means for superimposing on said second speed, during operation of said harvester, small speed adjustments to roll said sod to a selected tightness.

10. A sod harvester according to claim 9 wherein said drive means includes a hydraulic pump, means for operating said hydraulic pump in synchronism with said ground speed, and said adjustment means comprises an adjustable speed motor driven by said hydraulic pump and connected to said second conveyor means for driving said second conveyor means 11. A sod harvester adapted for travel forwardly along a path of travel and comprising: a frame, a cutting mechanism including an undercutting blade mounted on said frame for undercutting a strip of sod, a first conveyor extending rearwardly and upwardly from said undercutting blade to carry cut sod to a first raised position, a second conveyor pivotally connected to the rear end of said first conveyor and extending downwardly therefrom and having a discharge end, to carry cut sod to said discharge end, spring means biasing said second conveyor upwardly, a sod roll forming enclosure below said discharge end of said second conveyor, said enclosure including a bottom conveyor connected to said frame below said discharge end of said second conveyor and sloping upwardly and rearwardly, said bottom conveyor having a front end and a rear end, a front conveyor connected to the frame of said harvester and extending upwardly from the front end of said bottom conveyor, said bottom conveyor having an upper surface and said front conveyor having a rear surface, and means for driving the upper surface of said bottom conveyor forwardly and the rear surface of said front conveyor upwardly to form a roll from sod discharged into said sod roll forming enclosure from said second conveyor, whereby said second conveyor will tilt downwardly due to the weight of sod passing thereover, to reduce the distance through which sod must drop from the discharge end of said second conveyor to said bottom conveyor when said roll is being started.

12. A sod harvester according to claim 11 and including clearance means mounted on and extending below said second conveyor to support said second conveyor on the sod roll as it is formed and to hold said second conveyor clear of such sod roll.

13. A sod harvester according to claim 12 and including means pivotally connecting said bottom conveyor to said frame for movement between a rearwardly and upwardly sloping latched position and a rearwardly and downwardly sloping discharge position, latch means for unlatching said second conveyor whereby to discharge a roll of sod which has been formed in said enclosure, and bias means for returning said bottom conveyor to said latched position when the weight of a sod roll has been removed from said bottom conveyor.

14. A sod harvester according to claim 11 wherein said bottom conveyor slopes upwardly and rearwardly, said front conveyor slopes generally vertically, said bottom and front conveyors having ends located in close proximity to each other to define an apex with said bottom and front conveyors defining substantially a right angle between them, the upper surface of said bottom conveyor having a concavity therein to reduce the distance between the periphery of said sod roll and said apex.

15. A sod harvester according to claim 14 wherein the rear surface of said front conveyor also has a concavity therein to reduce said distance.

16. A sod harvester adapted for travel along a path of travel and comprising:
 (a) means for undercutting sod,
 (b) conveyor means for conveying cut sod away from said undercutting means,
 (c) said conveyor means including a conveyor section therein for redirecting the horizontal component of the direction of travel of cut sod from a first direction parallel with the path of travel to a direction disposed at an angle to said first direction, (d) said conveyor section including an inner radius side and an outer radius side, said inner radius side being curved vertically so that the distance along said conveyor section between its ends is constant across the width of said conveyor section.

17. A sod harvester according to claim 16 wherein said conveyor means includes means for forming a roll of sod from said cut sod and for discharging said roll, and wherein said angle is large enough for said conveyor means to discharge said roll to a position which is laterally clear of the next pass of said harvester.

18. A sod harvester according to claim 17 wherein said angle is approximately 30 degrees.

19. A sod harvester adapted for travel along a path of travel and comprising:
 (a) means for undercutting sod and for forming a strip of cut sod,
 (b) a sod roll forming enclosure,
 (c) conveyor means for conveying said strip of sod into said sod roll forming enclosure,
 (d) and further conveyor means located in said enclosure for forming a roll of sod,
 (e) said further conveyor means comprising first and second conveyors each having an end, said ends being located in close proximity to each other to form an apex with said first and second conveyors extending from said apex at approximately a right angle, thereby to form a roll of sod between them while reducing the likelihood of a secondary sod roll forming should breakage occur in said strip of sod.

20. A sod harvester according to claim 19 wherein said first conveyor is a bottom conveyor and slopes slightly downwardly toward said second conveyor.

21. A sod harvester according to claim 20 wherein said first mentioned conveyor means is oriented to convey said strip of sod to a raised position and to discharge said strip of sod from said raised position downwardly into said enclosure, said enclosure being located below said raised position.

22. A sod harvester according to claim 19 wherein said first conveyor has a concavity in its surface facing said sod roll, to reduce the distance between the periphery of said sod roll and said apex.

23. A sod harvester according to claim 19 wherein the surfaces of said first and second conveyors which face said sod roll each have a concavity therein to reduce the distance between the periphery of said sod roll and said apex, thus to reduce the likelihood of a secondary roll of sod forming if breakage occurs in said strip of sod.

24. A sod harvester adapted for travel along a path of travel and comprising:
 (a) means for undercutting sod and for forming a strip of cut sod,
 (b) a sod roll forming enclosure,
 (c) conveyor means for conveying said strip of sod into said sod roll forming enclosure,
 (d) and further conveyor means located in said enclosure for forming a roll of sod,
 (e) said further conveyor means comprising first and second conveyors each having an end, said ends being located in close proximity to each other to form an apex with said first and second conveyors extending from said apex with a substantial angle between them, thereby to form a roll of sod between them while reducing the likelihood of a secondary sod roll forming should breakage occur in said strip of sod,
 (f) at least one of said first and second conveyors having a concavity in its surface which faces said sod roll, to reduce the distance between the periphery of said sod roll and said apex.

25. A sod harvester according to claim 24 wherein each of said first and second conveyors has a concavity in its surface which faces said sod roll, to reduce the distance between the periphery of said sod roll and said apex.

26. A sod harvester adapted for travel at a ground speed along a path of travel and comprising:
 (a) means for undercutting sod,
 (b) sod roll forming means,
 (c) first conveyor means for conveying cut sod to said sod roll forming means,
 (d) said sod roll forming means including second conveyor means for forming a roll of sod,
 (e) drive means responsive to said ground speed for normally driving said second conveyor means at a second speed which is synchronized with said ground speed,
 (f) said drive means including manually operable adjustment means for superimposing on said second speed, during operation of said harvester, small speed adjustments to roll said sod to a selected tightness.

27. A sod harvester according to claim 26 wherein said drive means includes a hydraulic pump, means for operating said hydraulic pump in synchronism with said ground speed, said adjustment means comprising an adjustable speed motor driven by said hydraulic pump and connected to said second conveyor means for driving said second conveyor means.

28. A sod harvester adapted for travel along a path of travel and comprising:
 (a) means for undercutting sod,
 (b) conveyor means for conveying cut sod away from said undercutting means,
 (c) said conveyor means including a conveyor section therein for redirecting the horizontal component of the direction of travel of cut sod from a first direction parallel with the path of travel to a second direction disposed at an angle to said first direction,
 (d) means for receiving said cut sod travelling in said second direction and for forming a roll of sod from such cut sod,
 (e) and means for discharging said roll in said second direction,
 (f) said angle being large enough for said roll to be discharged to a position which is laterally clear of the next pass of said harvester.

29. A sod harvester according to claim 28 wherein said angle is approximately 30°.

30. A sod harvester according to claim 28 wherein said conveyor section includes an inner radius side and an outer radius side, said inner radius side being curved vertically so that the distance along said conveyor section between its ends is constant across the width of said conveyor section, said conveyor section further including means fixed to said outer radius side thereof and travelling with said conveyor section for preventing sod on said conveyor section from sliding sideways toward said outer radius side.

* * * * *